(12) United States Patent
Harazuka et al.

(10) Patent No.: US 12,218,374 B2
(45) Date of Patent: Feb. 4, 2025

(54) SEPARATOR FOR INSULATING ADJACENT BATTERY CELLS AND POWER SUPPLY DEVICE

(71) Applicant: SANYO Electric Co., Ltd., Osaka (JP)

(72) Inventors: Kazuhiro Harazuka, Hyogo (JP); Naotake Yoshida, Hyogo (JP); Nao Takeda, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 726 days.

(21) Appl. No.: 17/439,457

(22) PCT Filed: Dec. 19, 2019

(86) PCT No.: PCT/JP2019/049755
§ 371 (c)(1),
(2) Date: Sep. 15, 2021

(87) PCT Pub. No.: WO2020/194929
PCT Pub. Date: Oct. 1, 2020

(65) Prior Publication Data
US 2022/0158292 A1 May 19, 2022

(30) Foreign Application Priority Data
Mar. 26, 2019 (JP) ................................. 2019-057593

(51) Int. Cl.
*H01M 50/291* (2021.01)
*H01M 10/647* (2014.01)
(Continued)

(52) U.S. Cl.
CPC ....... *H01M 50/291* (2021.01); *H01M 10/647* (2015.04); *H01M 10/658* (2015.04);
(Continued)

(58) Field of Classification Search
None
See application file for complete search history.

(56) References Cited

U.S. PATENT DOCUMENTS

| 2016/0254504 A1* | 9/2016 | Kim ................... H01M 10/613 |
| | | 429/99 |
| 2019/0190098 A1* | 6/2019 | Abe .................... H01M 50/293 |

(Continued)

FOREIGN PATENT DOCUMENTS

| JP | 2018-133152 | 8/2018 |
| JP | 2018-204708 | 12/2018 |

(Continued)

OTHER PUBLICATIONS

International Search Report of PCT application No. PCT/JP2019/049755 dated Mar. 17, 2020.

*Primary Examiner* — Anca Eoff
(74) *Attorney, Agent, or Firm* — WHDA, LLP

(57) ABSTRACT

A power supply device according to an aspect of the present invention includes a plurality of battery cells having a flat right-angled parallelepiped shape and a plurality of separators insulating adjacent ones of the plurality of battery cells. Each of the plurality of separators includes heat insulating sheet arranged between adjacent one of the plurality of battery cells and an adjacent cell adjacent to the one of the plurality of battery cells among the plurality of battery cells, and insulating molded member holding heat insulating sheet. Insulating molded member includes lower wall covering lower surfaces of one of the plurality of battery cells and an adjacent cell adjacent to the one of the plurality of battery cells among the plurality of battery cells, and holder holding insulating sheet with a gap disposed between lower wall and insulating sheet.

4 Claims, 3 Drawing Sheets

(51) Int. Cl.
*H01M 10/658* (2014.01)
*H01M 50/209* (2021.01)
*H01M 50/24* (2021.01)
*H01M 50/289* (2021.01)
*H01M 50/293* (2021.01)

(52) U.S. Cl.
CPC ......... *H01M 50/209* (2021.01); *H01M 50/24* (2021.01); *H01M 50/289* (2021.01); *H01M 50/293* (2021.01)

(56) References Cited

U.S. PATENT DOCUMENTS

2020/0058912 A1    2/2020   Kuramitsu et al.
2021/0305640 A1*   9/2021   Takeda .............. H01M 10/6555
2021/0313637 A1*  10/2021   Yamashiro ........ H01M 10/6555

FOREIGN PATENT DOCUMENTS

WO      2018/061894       4/2018
WO      WO-2018110055 A1 *  6/2018  ............. B32B 27/12

\* cited by examiner

SEPARATOR FOR INSULATING ADJACENT BATTERY CELLS AND POWER SUPPLY DEVICE

CROSS-REFERENCE TO RELATED APPLICATIONS

This application is a U.S. national stage application of the PCT International Application No. PCT/JP2019/049755 filed on Dec. 19, 2019, which claims the benefit of foreign priority of Japanese patent application No. 2019-057593 filed on Mar. 26, 2019, the contents all of which are incorporated herein by reference.

TECHNICAL FIELD

The present invention relates to a separator that insulates adjacent battery cells, and a power supply device that includes a plurality of battery cells and a plurality of separators.

BACKGROUND ART

In recent years, electric vehicles using a power supply device for propulsion have become widespread. Electric vehicles come in various configurations such as a battery electric vehicle (BEV) equipped with a driving motor, a hybrid electric vehicle (HEV) equipped with an engine in addition to a motor. The power supply device equipped on these electric vehicles uses a plurality of battery cells. Each battery cell is a chargeable and dischargeable secondary battery such as a lithium ion battery or a nickel hydrogen battery.

Typically, the power supply device described in Patent Literature 1 below is known. The power supply device disclosed in Patent Literature 1 is configured with a plurality of battery cells and a plurality of separators arranged and gathered without a gap. With this configuration, the power supply device is downsized and has a high energy density.

CITATION LIST

Patent Literature

PTL 1: Unexamined Japanese Patent Publication No. 2018-133152

SUMMARY OF THE INVENTION

Since this type of power supply device is used in various environments, dew condensation water sometimes adheres thereto. In particular, the battery cell has a large temperature change, and dew condensation water tends to be easily generated near the battery cell. As described above, the power supply device disclosed in PTL 1 is configured with a plurality of battery cells and a plurality of separators arranged and gathered without a gap, but strictly, a minute gap is disposed between the battery cell and the separator due to an influence of dimensional tolerance, flatness, and the like. Therefore, when dew condensation water is generated near the battery cell, the dew condensation water is likely to be sucked from between the battery cell and the separator due to the minute space because of a capillary phenomenon. In the capillary phenomenon, the smaller the gap is, the greater the effect of sucking becomes.

The present invention has been made to solve such a problem, and a main object of the present invention is to provide a power supply device configured to suppress sucking of dew condensation water due to the capillary phenomenon while achieving downsizing of the power supply device.

A power supply device according to an aspect of the present invention includes a plurality of battery cells having a flat right-angled parallelepiped shape, and a plurality of separators insulating adjacent battery cells. Each separator includes a heat insulating sheet arranged between adjacent battery cells, and an insulating molded member holding the heat insulating sheet. The molded member has a lower wall covering the lower surfaces of the adjacent battery cells, and a holder holding an insulating sheet with a gap disposed between the lower wall and the insulating sheet.

According to the present invention, it is possible to suppress sucking of dew condensation water due to the capillary phenomenon while achieving downsizing of the power supply device.

DESCRIPTION OF EMBODIMENTS (Power Supply Device)

Figure 1:
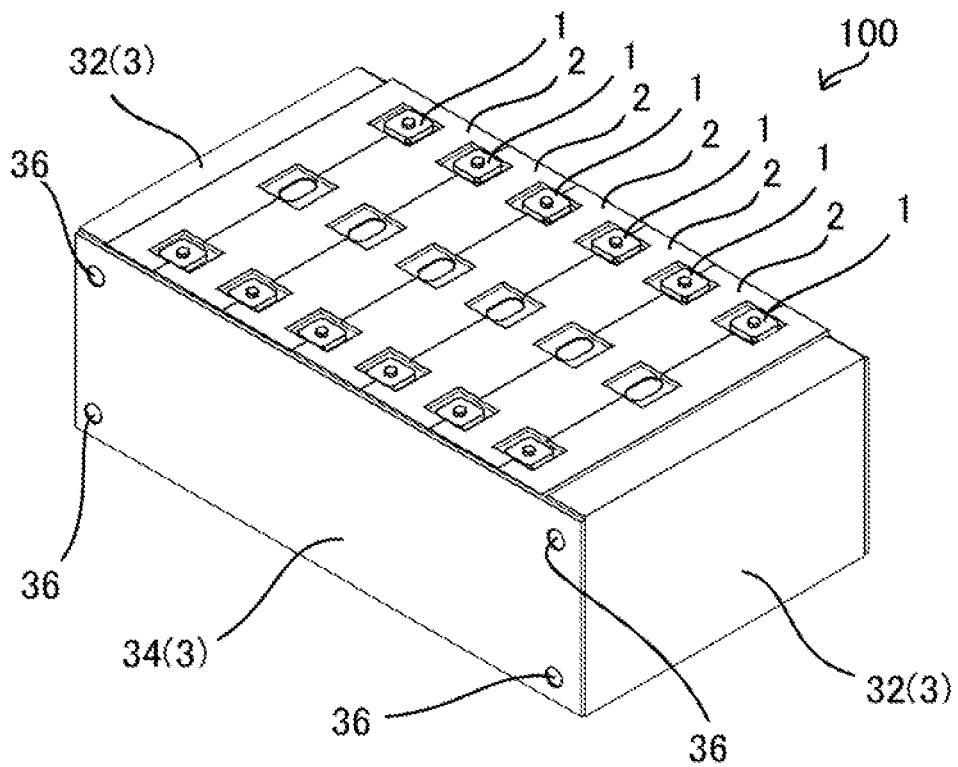
FIG. 1 is a perspective view of a power supply device according to an aspect of the present invention.

FIG. 1 is a perspective view of power supply device 100 according to an aspect of the present invention. As shown in FIG. 1, power supply device 100 includes a plurality of battery cells 1, a plurality of separators 2, and restraint member 3 that gathers the plurality of battery cells 1 and the plurality of separators 2. The plurality of battery cells 1 are arranged along one direction. Each separator 2 is arranged between adjacent battery cells 1, and holds adjacent battery cells 1. The plurality of separators 2 have insulating properties and prevent short circuit between adjacent battery cells 1. Separator 2 includes a heat insulating sheet, and suppresses heat transfer between adjacent battery cells. The plurality of battery cells 1 are connected in series or in parallel via a bus bar (not illustrated). In power supply device 100, a voltage and a capacity of the power supply device are determined in accordance with the number of battery cells 1 connected in parallel and the number of battery cells 1 connected in series. As battery cells 1, various secondary batteries such as lithium ion secondary batteries or nickel hydrogen batteries can be adopted.

The heat insulating sheet included in separator 2 is a sheet having a thickness of 0.1 mm to 3.0 mm, and includes a fiber material made of a woven fabric, a nonwoven fabric, or the like, and a heat insulating material supported between fibers of the fiber material. The heat insulating sheet suitable for an exemplary embodiment of the present invention has a characteristic that the thermal conductivity is less than or equal to 0.02 W/(m·K). The heat insulating material is preferably a porous material having a void structure such as xerogel or aerogel. In particular, silica aerogel and silica xerogel have a nano-size void structure that regulates movement of air molecules, and have excellent thermal insulation performance. Silica xerogel can stably maintain its structure against external pressing. Since silica particles have a high melting point, silica xerogel also has high heat resistance. As the fiber constituting the fiber sheet, various fibers can be used, and the fiber may contain a flame-retardant fiber having heat resistance. As the flame-retardant fibers, oxidized acrylic fibers, flame-retardant vinylon fibers, polyetherimide fibers, aramid fibers, glass fibers, and the like are known. In particular, when containing glass fibers, the fiber sheet is expected to improve rigidity and suppress of creep deformation in addition to improvement of heat resistance. A heat insulating sheet using a fiber sheet containing flame-retardant fibers is not damaged even when battery cells 1 are heated to a high temperature due to thermal runaway, and can stably block conduction of thermal energy to effectively prevent induction of thermal runaway.

The fiber contained in the heat insulating sheet is preferably a synthetic fiber having a small fiber diameter. Since the heat insulating property of the heat insulating sheet is attributable to the characteristics of the powder described later, a large amount of powder can be included in the heat insulating material by using a synthetic fiber having a small fiber diameter as a base material. The fiber diameter of the fiber used in the present exemplary embodiment is preferably 1 μm to 30 μm from the viewpoint of achieving both thermal conductivity and productivity.

The heat insulating sheet described above may be molded with a thermoplastic resin added. The heat insulating sheet to which the thermoplastic resin is added can improve rigidity. Various characteristics can be imparted by coating the surface of the heat insulating sheet. For example, by covering with a coating layer made of alumina having a low radiation rate, it is possible to suppress the influence of radiation heat transfer of the heat insulating member. By adjusting additives when forming the heat insulating sheet in this manner, it is possible to appropriately impart physical characteristics in accordance with required performance with heat insulating properties, heat resistance, and the like maintained.

As shown in FIG. 1, restraint member 3 includes a pair of end plates 32 arranged at both ends in the stacking direction of the plurality of battery cells 1 that are stacked, and a plurality of binding bars 34 fixed to the pair of end plates 32. The end of binding bar 34 is coupled to end plate 32. Binding bar 34 is fixed to end plate 32 via set screw 36.

Binding bar 34 is manufactured by processing a metal plate having a predetermined thickness into a predetermined width. By coupling ends to end plate 32, binding bar 34 couples the pair of end plates 32 and holds battery cells 1 therebetween. By fixing the pair of end plates 32 to a predetermined dimension, binding bar 34 suppresses expansion of battery cells 1 stacked therebetween. When binding bar 34 extends, the expansion of battery cell 1 cannot be prevented. Therefore, binding bar 34 is manufactured by processing a metal plate having enough strength not to extend by the expansion pressure of battery cells 1, e.g., a metal plate such as a stainless steel plate such as SUS304 or a steel plate, into a width and a thickness having sufficient strength.

While binding bar 34 of FIG. 1 is fixed to end plate 32 with set screw 36, binding bar 34 is not necessarily fixed with a screw member. Specifically, binding bar 34 can be fixed by using welding, a locking structure, or the like. Power supply device 100 of FIG. 1 has a configuration in which binding bar 34 is fixed to the side surface of end plate 32. However, the fixing structure between the end plate and the binding bar is not limited to the illustrated configuration.

A function necessary as binding bar 34 is to regulate a relative distance between the pair of end plates 32. End plate 32 and binding bar 34 may have any configuration as long as displacement of the pair of end plates can be regulated.

(Battery Cell)

Figure 2:
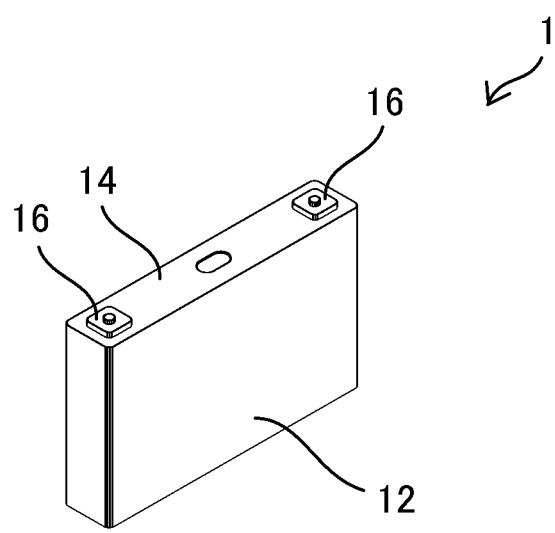
FIG. 2 is a perspective view of a battery cell of FIG. 1.

As shown in FIG. 2, battery cell 1 includes exterior can 12 having a right-angled parallelepiped shape, and sealing body 14 provided with positive and negative electrode terminals 16. In addition, battery cell 1 has an electrode body housed in exterior can 12. Exterior can 12 is filled with an electrolytic solution. Battery cell 1 has a characteristic of expanding or contracting with charging or discharging or deterioration.

Exterior can 12 is disposed in a box shape having an opening. Sealing body 14 is welded to exterior can 12 to close the opening of exterior can 12. Specifically, exterior can 12 is manufactured by deep-drawing a metal plate of aluminum, an aluminum alloy, or the like. Sealing body 14 is manufactured of a metal plate of aluminum, an aluminum alloy, or the like, in the same manner as exterior can 12. Positive and negative electrode terminals 16 are fixed to both ends of sealing body 14. Sealing body 14 is welded while being inserted into the opening of exterior can 12. Typically, by irradiating a boundary between an outer periphery of sealing body 14 and an inner periphery of exterior can 12 with a laser beam, sealing body 14 is airtightly fixed to exterior can 12.

In the battery cell in which the exterior can and the sealing body are made of metal, the metal is exposed on the surface. Some of this type of battery cells have a configuration in which the surface of the exterior can is covered with an insulating heat shrinkable tube in order to prevent short circuit via dew condensation water or the like. Also in the present exemplary embodiment, a configuration in which the surface of exterior can 12 is covered with a heat shrinkable tube may be adopted as necessary.

(Separator 2)

Figure 3:
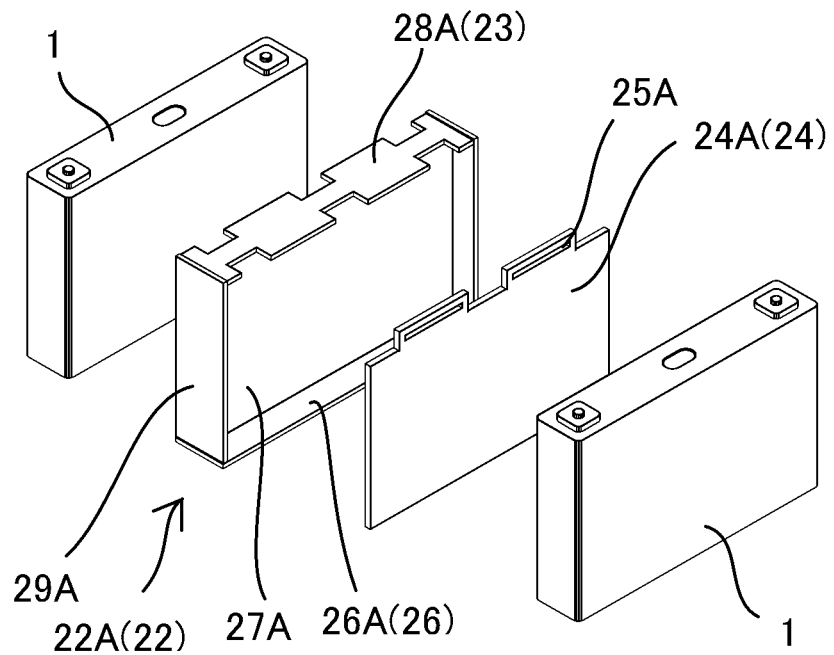
FIG. 3 is a perspective view showing an example of a separator of FIG. 1.
Figure 4:
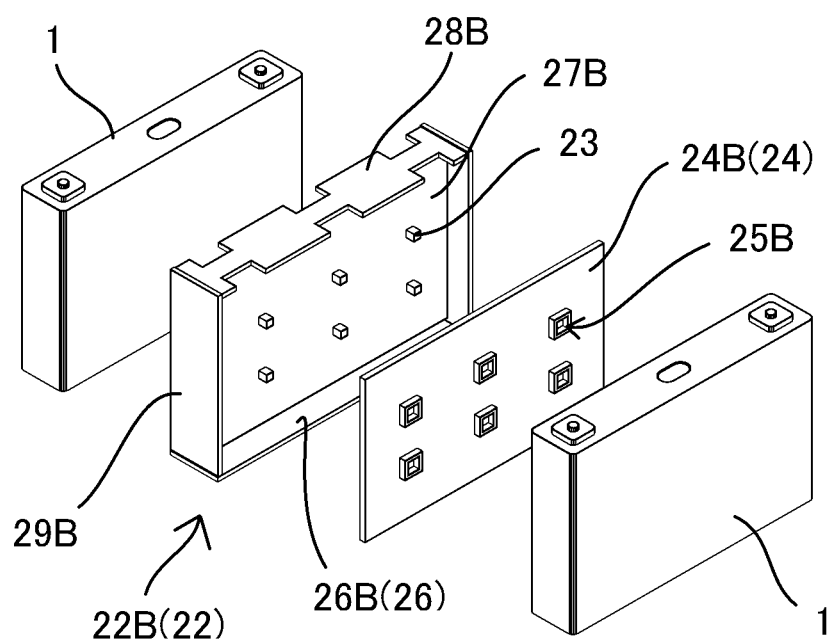
FIG. 4 is a perspective view showing an example of the separator in FIG. 1.
Figure 5:
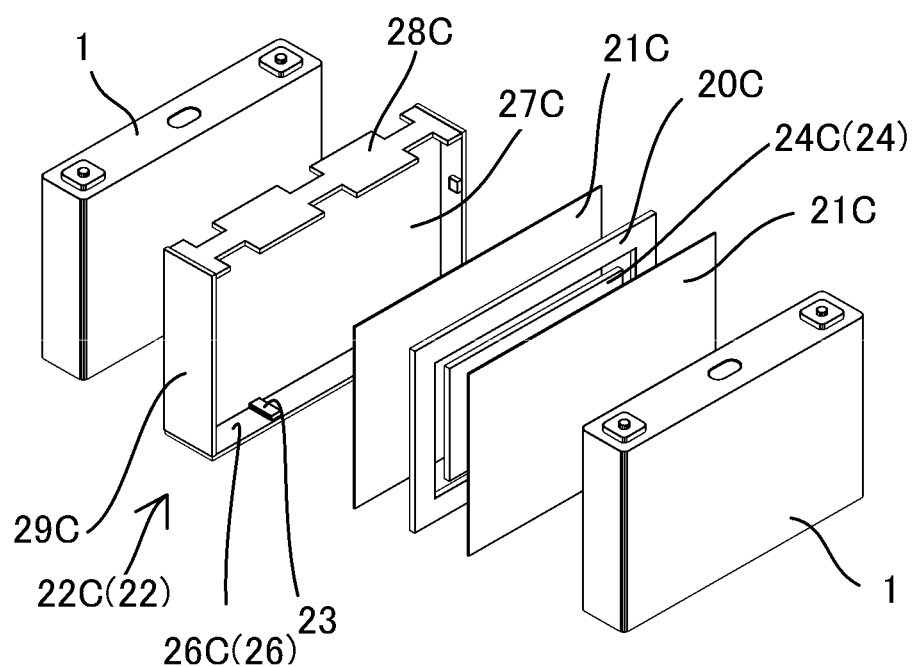
FIG. 5 is a perspective view showing an example of the separator in FIG. 1.

FIGS. 3 to 5 are perspective views showing an example of separator 2. Separator 2 shown in FIGS. 3 to 5 includes heat insulating sheet 24 arranged between adjacent battery cells, and molded member 22 having insulation holding heat insulating sheet 24. Preferably, the heat insulating sheet described above is used as heat insulating sheet 24. Molded member 22 has lower wall 26 covering lower surfaces of adjacent battery cells, and holder 23 holding heat insulating sheet 24 with a gap disposed between lower wall 26 and heat insulating sheet 24.

In general, a power supply device having a plurality of battery cells is preferably configured with a plurality of battery cells and a plurality of separators arranged and gathered without a gap in order to reduce a dimension of the power supply device. However, when the battery cells and the separators are arranged and gathered without a gap, there is a possibility that dew condensation water or the like, if any, is sucked from between the battery cells and the separators to the upper surface of the battery cells due to the capillary phenomenon.

As described above, separator 2 illustrated in FIGS. 3 to 5 is configured to include holder 23 holding heat insulating sheet 24 with a gap disposed between lower wall 26 and heat insulating sheet 24, and the gap functions as a space for storing dew condensation water between lower wall 26 and heat insulating sheet 24. In particular, in order to prevent sucking due to the capillary phenomenon, it is desirable to set a gap between lower wall 26 and heat insulating sheet 24 to a sufficient size.

(Separator 2A)

FIG. 3 is a perspective view showing an example of separator 2 of FIG. 1. As shown in FIG. 3, separator 2A includes heat insulating sheet 24A and molded member 22A. Molded member 22A has lower wall 26A covering the lower surface of the battery cell and upper wall 28A covering the upper surface of the battery cell. As shown in FIG. 3, molded member 22A may further include base 27A extending between adjacent battery cells and side wall 29A covering the side surfaces of the battery cells. Heat insulating sheet 24A has through hole 25A through which upper wall 28A can be inserted. Heat insulating sheet 24A is held in a state of being lifted by upper wall 28A when upper wall 28A of molded member 22A is inserted into through hole 25A. Heat insulating sheet 24A held by upper wall 28A has a dimension in which a gap is disposed between heat insulating sheet 24A and lower wall 26A of molded member 22A. Thus, in separator 2A, upper wall 28A functions as holder 23 described above.

In the example of FIG. 3, heat insulating sheet 24A is configured to have through hole 25A, but is not necessarily required to have a through hole. Heat insulating sheet 24A can be configured to, for example, have a bottomed hole and be held by upper wall 28A inserted into the bottomed hole.

(Separator 2B)

FIG. 4 is a perspective view showing an example of separator 2 of FIG. 1. As shown in FIG. 4, separator 2B includes heat insulating sheet 24B and molded member 22B. Molded member 22B has lower wall 26B covering the lower surfaces of the battery cells and base 27B extending between adjacent battery cells. As holder 23, base 27B has protrusions disposed on opposing surfaces. As shown in FIG. 4, molded member 22B may further include upper wall 28B covering the upper surfaces of the battery cells and side wall 29B covering the side surfaces of the battery cells. Heat insulating sheet 24B has through hole 25B into which a protrusion formed on base 27B can be inserted. Heat insulating sheet 24A is held in a state of being lifted by base 27B when the protrusion of base 27B is inserted into through hole 25B. Heat insulating sheet 24B held by base 27B has a dimension in which a gap is disposed between heat insulating sheet 24B and lower wall 26B of molded member 22B.

In the example of FIG. 4, heat insulating sheet 24B is configured to have through hole 25B, but is not necessarily required to have a through hole. Heat insulating sheet 24B can be configured to, for example, have a bottomed hole and be held by holder 23 inserted into the bottomed hole.

(Separator 2C)

FIG. 5 is a perspective view showing an example of separator 2 of FIG. 1. As shown in FIG. 5, separator 2C includes circular resin frame 20C, heat insulating sheet 24C arranged in a circle of resin frame 20C, film 21C integrating resin frame 20C and heat insulating sheet 24C, and molded member 22C. Molded member 22C includes lower wall 26C covering the lower surfaces of the battery cells. Lower wall 26 has a protrusion. As shown in FIG. 5, molded member 22C may be configured to include base 27C extending between adjacent battery cells, upper wall 28C covering the lower surfaces of battery cells 1, and side wall 29C covering side surfaces of battery cells 1. Heat insulating sheet 24C is integrated with circular resin frame 20C having a higher rigidity than the rigidity of the heat insulating sheet 24C. By holding resin frame 20C, it is possible to hold heat insulating sheet 24C at a predetermined position. As described above, lower wall 26C is provided with the protrusion functioning as holder 23. A gap is disposed between lower wall 26C and resin frame 20C when this protrusion and resin frame 20C abut against each other.

The present invention has been described above based on the exemplary embodiments. It is to be understood by those skilled in the art that these exemplary embodiments are illustrative, that various modifications can be made to combinations of the components and the processes, and that such modifications are also within the scope of the present invention.

REFERENCE MARKS IN THE DRAWINGS

100: power supply device
1: battery cell
12: exterior can
14: sealing body
16: electrode terminal
2, 2A, 2B, 2C: separator
20C: resin frame
21C: film
22, 22A, 22B, 22C: molded member
23: holder
24, 24A, 24B, 24C: heat insulating sheet
25A, 25B: through hole
26, 26A, 26B, 26C: lower wall
27A, 27B, 27C: base
28A, 28B, 28C: upper wall
29A, 29B, 29C: side wall
3: restraint member
32: end plate
34: binding bar
36: set screw

The invention claimed is:

1. A power supply device comprising:
a plurality of battery cells having a flat right-angled parallelepiped shape; and
a plurality of separators each insulating a corresponding pair of adjacent battery cells among the plurality of battery cells, wherein
each of the plurality of separators includes:
a heat insulating sheet arranged between the adjacent battery cells; and
an insulating molded member holding the heat insulating sheet, the insulating molded member includes:
a lower wall covering lower surface of each of the adjacent battery cells; and
a holder holding the heat insulating sheet with a gap disposed between the heat insulating sheet and the lower wall,
the heat insulating sheet includes at least one through hole or bottomed hole,
the holder is a protrusion insertably disposed in the at least one through hole or the bottomed hole, and
the insulating molded member further includes an upper wall partially covering upper surfaces of an adjacent cell adjacent to the one of the plurality of battery cells among the plurality of battery cells, and the holder is included in the upper wall.

2. The power supply device according to claim 1, wherein the heat insulating sheet includes a fiber material and a heat insulating material including a higher heat insulating property than a heat insulating property of the fiber material.

3. A power supply device comprising:
a plurality of battery cells having a flat right-angled parallelepiped shape; and a plurality of separators each insulating a corresponding pair of adjacent battery cells among the plurality of battery cells, wherein each of the plurality of separators includes:
- a heat insulating sheet arranged between the adjacent battery cells; and
- an insulating molded member holding the heat insulating sheet, the insulating molded member includes:
- a lower wall covering lower surface of each of the adjacent battery cells; and
- a holder holding the heat insulating sheet with a gap disposed between the heat insulating sheet and the lower wall, each of the plurality of separators further includes a circular resin frame and a film integrating the circular resin frame and the heat insulating sheet with the heat insulating sheet arranged in a circle of the circular resin frame, and the lower wall of the insulating molded member includes a protrusion disposed, and a gap is disposed between the lower wall and the circular resin frame by the protrusion.

4. The power supply device according to claim 3, wherein the heat insulating sheet includes a fiber material and a heat insulating material including a higher heat insulating property than a heat insulating property of the fiber material.

* * * * *